United States Patent [19]

Ominato

[11] Patent Number: 4,752,725
[45] Date of Patent: Jun. 21, 1988

[54] CONTROL APPARATUS FOR THREE-PHASE INDUCTION MOTOR

[75] Inventor: Hirotaro Ominato, Tokyo, Japan

[73] Assignee: Nikki Denso Co., Ltd., Kanagawa, Japan

[21] Appl. No.: 933,236

[22] Filed: Nov. 21, 1986

[30] Foreign Application Priority Data

Sep. 10, 1985 [JP] Japan ................................ 60-198471

[51] Int. Cl.$^4$ .............................................. H02P 5/40
[52] U.S. Cl. ..................................... 318/807; 318/809
[58] Field of Search ......... 318/802, 803, 805, 807–811

[56] References Cited

U.S. PATENT DOCUMENTS 4,306,182 12/1981 Curtiss ................................. 318/811
4,451,771  5/1984 Nagase et al. ...................... 318/802
4,456,868  6/1984 Yamamura et al. ................ 318/802

Primary Examiner—David Smith, Jr.
Attorney, Agent, or Firm—James E. Nilles; Thomas F. Kirby

[57] ABSTRACT

A three-phase induction motor control apparatus resorting to a slip frequency control type vector control system having three-phase sine wave generating device, first operation device, second operation device, and vector operation device; whereby a current command value and a frequency command value are determined in accordance with a difference between a set velocity and a real velocity to determined a control current value. The three-phase sine wave generating device generates a three-phase sine wave having a frequency according to the frequency command value. The first operation device multiplies one of outputs, which are outputted from the three-phase sine wave generating device and mutually have a phase difference of 120°, and a preset value to determine one current component value. The second operation device adds one half of the preset value to the current command value and multiplies this resultant value and the other of the outputs generated from the three-phase sine wave generating device to determine the other current component value. The vector operation device determines the vector sum of those one and other current component values to output it as the control current value.

1 Claim, 3 Drawing Sheets

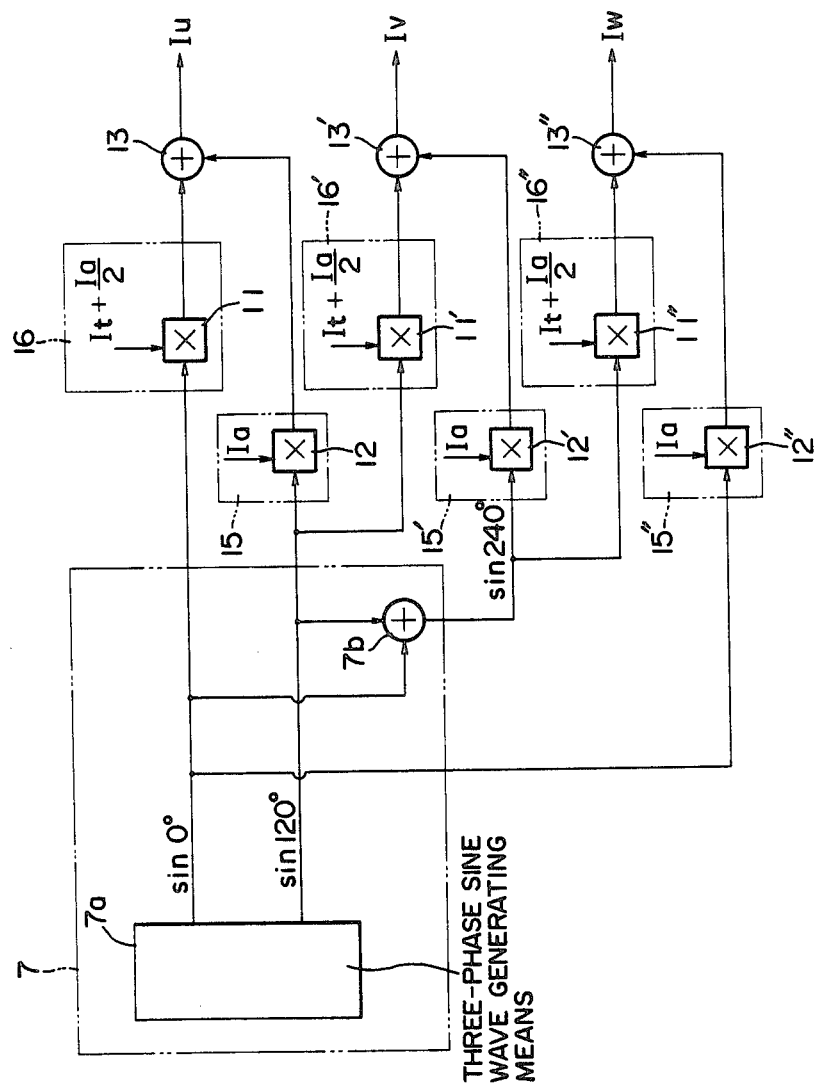

CONTROL APPARATUS FOR THREE-PHASE INDUCTION MOTOR

BACKGROUND OF THE INVENTION

1. Field of the Invention

The present invention relates to an apparatus for controlling an induction motor by using a slip frequency control type vector control system and, more particularly, to a three-phase induction motor control apparatus which is enabled to contral a three-phase induction motor highly precisely with a simple circuitry.

2. Description of the Prior Art

Generally speaking, the induction motor is widely used as a prime mover aiming mainly at a constant run partly because it has the simplest construction among various types of electric motors and partly because it is small and strong, can cause a commercial a.c. power source and can be produced at a reasonable cost. In case a precise variable-speed control is demanded, on the other hand, a d.c. motor is ordinarily used. This is because the d.c. motor can freely control its output such as torque or velocity in accordance with the characteristics required for a load by controlling the current or voltage of an armature or the current of a field system.

Despite of this fact, however, the d.c. motor is equipped with mechanically wearing parts such as a commutator, brushes, etc., so that it has to be subjected to periodic maintenance, inspection, and replacement of parts. Moreover, the d.c. motor cannot be used in an atmosphere of explosive or corrosive gases because it has the aforementioned mechanically wearing parts and has a limitation to a high-speed rotation and a high-voltage supply because its rectification is limited. From its structural requirement, still moreover, the d.c. motor has to be complicated and expensive. Thus, the d.c. motor cannot always be appropriate for a control motor.

These problems are eliminated from the induction motor, which in turn has its control system complicated remarkably in case it is used as the control motor. More specifically, the induction motor finds it difficult to be simply controlled, as compared with the d.c. motor, partly because not only the intensity of its magnetic field but also its torque is influenced if the armature current is controlled and partly because the intensity of the magnetic field is influenced if its frequency control is conducted. Moreover, the control range in this case is far more limited than in the case of the d.c. motor.

As an induction motor control system eliminating this point, there has been proposed a magnetic-field oriented vector control system which is represented by Japanese Patent Publication No. 34725/1975. This system has an effect that a control similar to that of the d.c. motor can be attained while taking the advantage of the induction motor. For practical uses, however, the induction motor has to be equipped therein with a sensor for detecting the magnetic field. This equipment deteriorates the effect of the induction motor, i.e., the simple construction and the freedom from any maintenance and raises the production cost. The control system is complicated because it also has to be equipped with a magnetic flux control unit.

As an induction motor control system having succeeded in improving this point, there have been proposed a variety of other control systems resorting to the slip frequency control type vector control system, as are exemplified by Japanese Patent Publications Nos. 40750/1982 and 32873/1981. In either of these control systems, a current command value is introduced from the difference between a set velocity value and a detected velocity value, this current command value is multiplied by the sine output of a two-phase sine wave generator to determine an active current, a cosine output having a phase difference of 90° from said active component of current is created from the output of said two-phase sine wave generator, this cosine output is multiplied by a preset value to determine a reactive component of current, and the value of orthogonal vector sum of the reactive component of current and said active component of current is used as the control current of each phase.

According to this control system, an excellent vector control can be attained without any requirement for a magnetic flux detector, a magnetic flux control circuit and so on. This control system is appropriate in the case of the two-phase induction motor because it has to introduce reactive component of current having a phase difference of 90° from the active component of current. In the case of the three-phase induction motor, however, the control system has to create a sine wave and a cosine wave for each phase so that its circuitry become complex and difficult and its numerical calculations become troublesome and difficult upon its design or design changes. In case the three-phase induction motor is to be controlled by this system, moreover, a two-three phase converter has to be added for the same reason, which in turn is a factor of complicating the circuitry.

SUMMARY OF THE INVENTION

The present invention has succeeded in solving all the above-specified problems and has an object to provide a three-phase induction motor control apparatus which has simple circuitry but can algebraically calculate the numeral design and can conduct a direct three-phase drive without any requirement for the two-three phase converter.

Another object of the preseent invention is to provide a three-phase induction motor control apparatus resorting to a slip frequency control type vector control system, which apparatus comprises three-phase sine wave generating means, first operation means, second operation means, and vector operation means; whereby a current command value and a frequency command value are determined in accordance with a difference between a set velocity and an actual velocity to determine a control current value.

The aforementioned three-phase sine wave generating means generates a three-phase sine wave having a phase difference of 120° and frequency according to the aforementioned frequency command value.

The first operation means multiplies one of outputs, which are outputted from said three-phase sine wave generating means and mutually have a phase difference of 120° from a fundamental phase, and a preset value to determine one current component value.

The second operation means adds one half of the aforementioned preset value to the aforementioned current command value and multiplies this resultant value and the other output of the fundamental phase generated from the three-phase sine wave generating means to determine the other current component value.

The vector operation means determines the vector sum of those one and other current component values to output it as the aforementioned control current value.

In the present invention, the three-phase sine wave generating means is caused to generate a three-phase sine wave having a frequency according to the frequency command value, and the first operation means is caused to multiply one of the aforementioned three-phase sine wave outputs having a phase difference of 120° from the fundamental phase and a preset value thereby to determine one current component value.

Moreover, the second operation means is caused to add one half of the aforementioned set value to the current command value, which is determined in accordance with the difference between the set velocity and the actual velocity, and to multiply this resultant value and the other output coming from the aforementioned three-phase sine wave generating means thereby to determine the other current component value.

Still moreover, the vector operation means is caused to determine a vector sum of those one and other current component values and to output it as a control current value thereby to control the three-phase induction motor.

Other objects and features of the present invention will be made apparent from the following description taken with reference to the accompanying drawings.

BRIEF DESCRIPTION OF THE DRAWINGS

In the drawings showing one embodiment of a three-phase induction motor control apparatus according to the present invention:

FIGS. 2 and 3 are circuit diagrams showing the same.

DESCRIPTION OF THE PREFERRED EMBODIMENT

Figure 1:
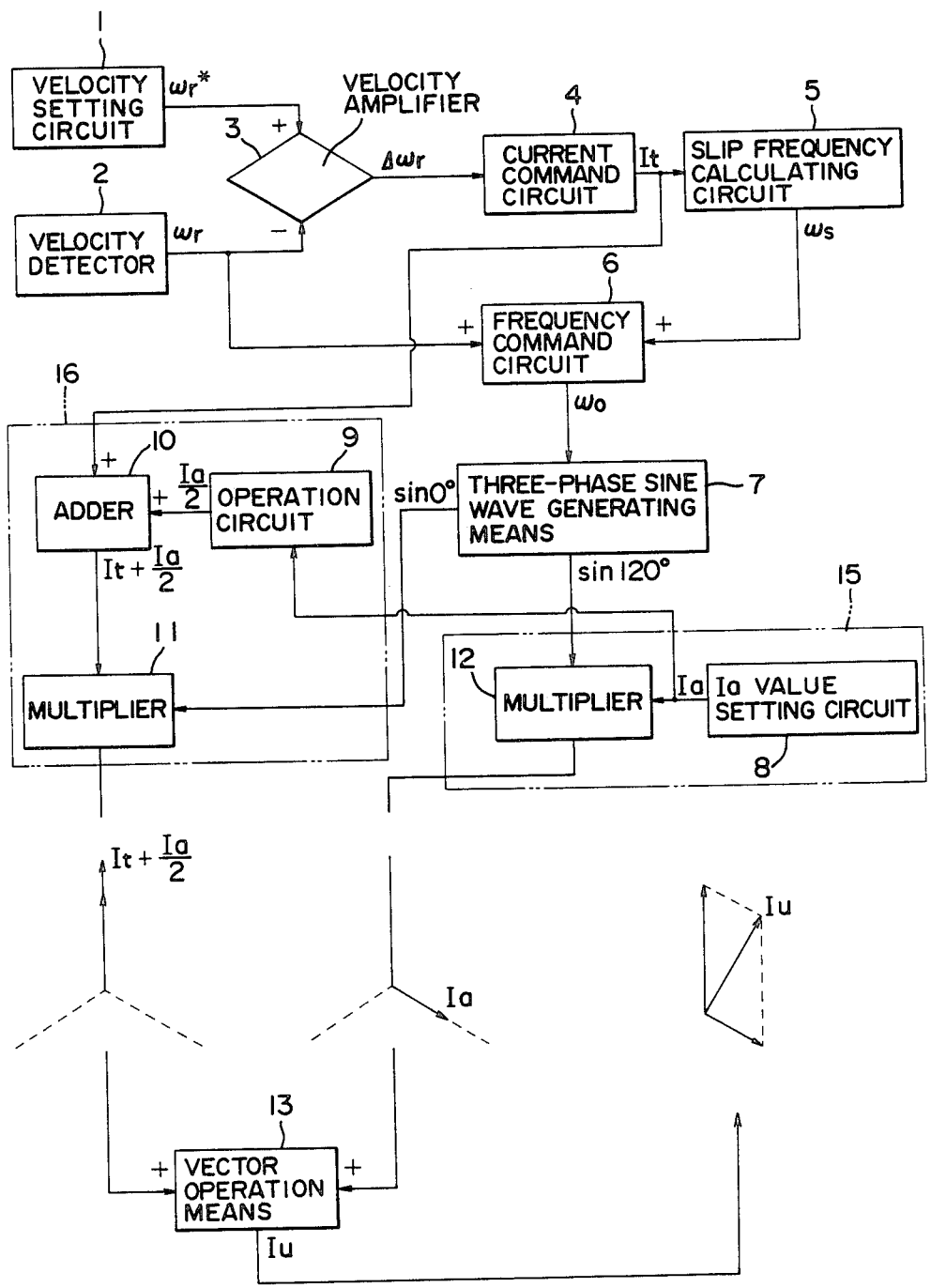
FIG. 1 is a block diagram showing a control system of the control apparatus.
Figure 2:
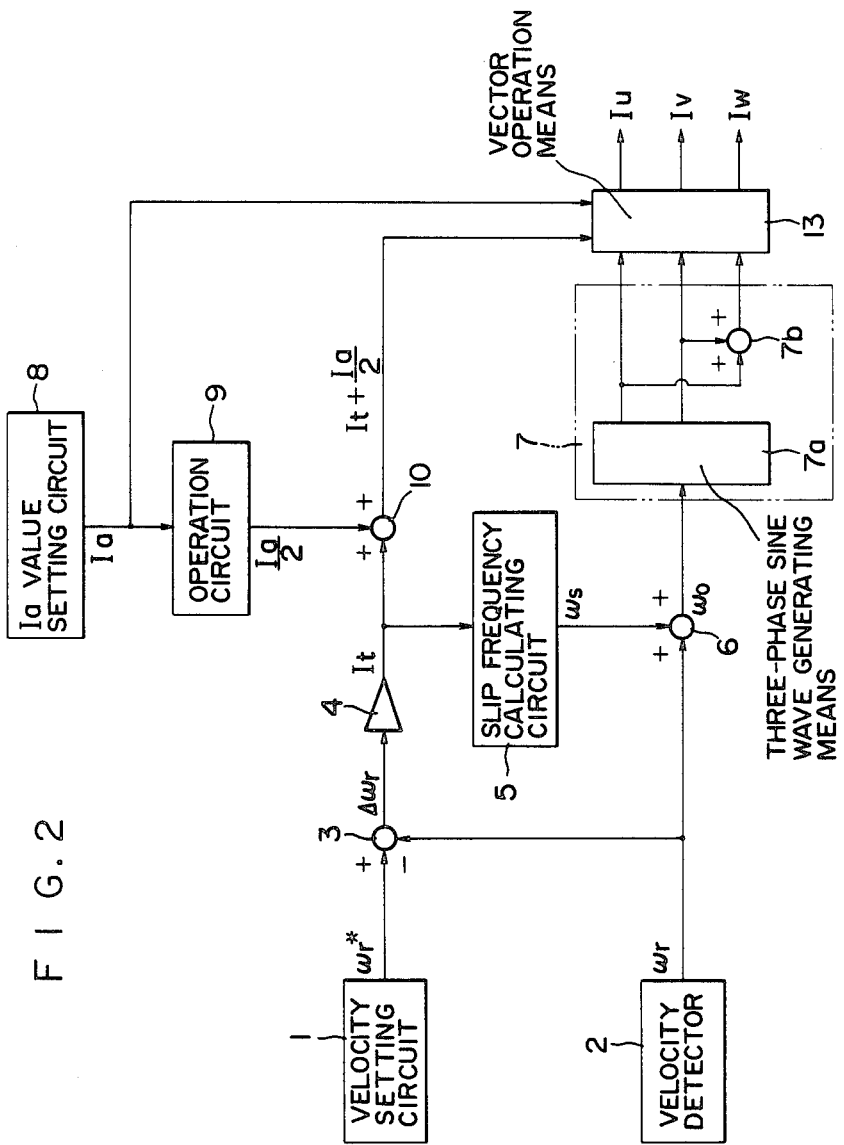

In FIGS. 1 and 2, reference numeral 1 denotes a velocity setting circuit for outputting a preset arbitrary velocity $\omega r^*$. Denoted at numeral 2 is a velocity detector for detecting and outputting an actual rotational velocity $\omega r$ of an electric motor to be controlled. Denoted at numeral 3 is a velocity amplifier which is made receptive of the aforementioned set velocity $\omega r^*$ and the actual velocity $\omega r$ for comparing them to output their differential value $\Delta \omega r$. Denoted at numeral 4 is a current command circuit for outputting a current command value It according to the aforementioned velocity differential value $\Delta \omega r$. Denoted at numeral 5 is a slip frequency calculating circuit which is made receptive of the aforementioned current command value It for determining a slip frequency $\omega s$ according to the same value by a predetermined arithmetic method to output it. Denoted at numeral 6 is a frequency command circuit for adding the aforementioned slip frequency $\omega s$ and the aforementioned actual velocity $\omega r$ to output a frequency command $\omega o$. Denoted at numeral 7 is three-phase sine wave generating means for outputting sine waves sin 0° and sin 120° having a frequency according to the aforementioned frequency command $\omega o$. Denoted at numeral 15 is first operation means which is composed of an Ia value setting circuit 8 and a multiplier 12 for calculating one current component value of a control current value. The Ia value setting circuit 8 outputs a preset fixed current value Ia which is proportional to the exciting current. Incidentally, the multiplier 12 will be described hereinafter. Designated at numeral 16 is second operation means which is composed of an operation circuit 9, an adder 10 and a multiplier 11 for calculating the other current component value of the aforementioned control current value. The aforementioned operation circuit 9 operates one-half of the aforementioned set value Ia to output one-half of the set value, i.e., one half of the bias current Ia. A control current Iu can be obtained by operating an active current component It which is a vector current value, and a reactive current component Im as expressed by the following equation.

$$Iu = It \sin \omega t + Im \sin(\omega t + 90°)$$
$$= (It + Ia/2)\sin \omega t + Ia \sin(\omega t + 120°)$$

where $Ia = (\frac{2}{3})Im$.

According to the equation, one half of the value Ia is utilized. The adder 10 outputs the vector current value (It+Ia/2) which is the sum of the aforementioned current command value It and the aforementioned bias current Ia/2. The multiplier 11 multiplies the aforementioned vector current value (It+Ia/2) and the output of sin 0° of the aforementioned three-phase sine wave generating means 7 to output one current component value (It+Ia/2) having a directivity of sin 0°. The multiplier 12 in the aforementioned first operation means 15 multiplies the aforementioned set value Ia and the output of sin 120° of the aforementioned three-phase sine wave generating means 7 to output the current component value Ia of sin 120° having a phase difference of 120° from the aforementioned current component value (It+Ia/2). Denoted at numeral 13 is vector arithmetic means for calculating the vector sum of the aforementioned two-directional current component values. Moreover, this vector sum is outputted as a control current Iu of one phase such as a U-phase of the three-phase induction motor.

Since the vector sum of the two-directional current component values having a phase difference of 120° can thus be used as the control current value, no cosine wave for determining the reactive component of current perpendicular to the active compononet of current of the prior art need by generated to provide a simple construction.

Next, an embodiment for extracting the individual control currents Iu, Iv and Iw of the three-phases will be described in the following with reference to FIG. 3. The aforementioned three-phase sine wave generating means 7 is constructed of: a three-phase sine wave generating unit 7a for outputting only two-phase waves of sin 0° and sin 120°; and an adder 7b for adding these two sine waves to compose sin 240°, so that the means 7 extracts three-directional current components each having a phase difference of 120°. Then, the values (It+Ia/2) and Ia are multiplied by the aforementioned values sin 0° and sin 120°, respectively, by the multipliers 11 and 12 and are added by the vector operation means 13 to extract the U-phase control current Iu. Likewise, the V-phase control current Iv is extracted from sin 120° and sin 240°, and the W-phase control current Iw is extracted from sin 240° and sin 0° to determine the three-phase control current.

According to the present invention, the control can be achieved only by the sine wave without any requirement for the waveform having a phase difference of 90° from sin 0°, i.e., the cosine wave for determining the reactive component of current perpendicular to the active component of current, as is different from the slip frequency control type vector control system of the prior art. As a result, it is possible to provide a remarkably simple and easy circuitry. Thus, it is also possible to conduct a numerial design algebraically with ease in case of a design and a design change. As exemplified in the embodiment, moreover, the wave of sin 240° can be obtained by composing sin 0° and sin 120° so that the control can be made only with the two-phase waves of sin 0° and sin 120°. Since the circuitry can be constructed without replacement with a two-phase equivalent circuit, still moreover, the three-phase induction motor can be controlled without any requirement for any two-three phase converter circuit.

What is claimed is:

1. In a three-phase induction motor control apparatus of a slip frequency control type vector control system for determining a current command value and a frequency command value in accordance with a difference between a set velocity and an actual velocity to determine a control current value on the basis of said current command value and said frequency command value, the improvement characterized by comprising: three-phase sine wave generating means for generating a three phase sine wave having outputs including a phase difference of 120° and a frequency according to said frequency command value; first operation means for multiplying one of said outputs coming from said three-phase sine wave generating means and having a phase difference of 120° from a fundamental phase and a preset value to determine one current component value; second operation means for adding one-half of said preset value to said current command value to provide a resultant value and for multiplying said resultant value and the other output of the fundamental phase coming from said three-phase sine wave generating means to determine the other current component value; and vector operation means for determining a vector sum of said one and the other current component values to output it as said control current value.

* * * * *